(12) United States Patent
Yoshio (10) Patent No.: US 12,515,788 B2
(45) Date of Patent: Jan. 6, 2026

(54) COMPOUND HELICOPTER

(71) Applicant: KAWASAKI JUKOGYO KABUSHIKI KAISHA, Kobe (JP)

(72) Inventor: Masashi Yoshio, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/195,943

(22) Filed: May 11, 2023

(65) Prior Publication Data

US 2024/0083573 A1 Mar. 14, 2024

Related U.S. Application Data

(63) Continuation of application No. PCT/JP2021/010133, filed on Mar. 12, 2021.

(51) Int. Cl.
| | |
|---|---|
| *B64C 27/26* | (2006.01) |
| *B64C 11/18* | (2006.01) |
| *B64C 11/20* | (2006.01) |
| *B64C 27/467* | (2006.01) |
| *B64C 27/473* | (2006.01) |

(52) U.S. Cl.
CPC .............. *B64C 27/26* (2013.01); *B64C 11/18* (2013.01); *B64C 11/20* (2013.01); *B64C 27/467* (2013.01); *B64C 27/473* (2013.01)

(58) Field of Classification Search
CPC ....... B64C 27/22; B64C 27/26; B64C 27/467; B64C 27/463; B64C 11/18; B64C 11/20
See application file for complete search history.

(56) References Cited

U.S. PATENT DOCUMENTS

| | | | |
|---|---|---|---|
| 8,070,089 B2* | 12/2011 | Ferrier | B64C 27/26 244/6 |
| 2010/0243792 A1* | 9/2010 | Queiras | B64C 27/26 244/6 |
| 2014/0353420 A1* | 12/2014 | Prud'Homme-Lacroix | B64C 27/82 244/6 |
| 2018/0057158 A1* | 3/2018 | Vialle | B64C 27/82 |
| 2019/0118935 A1* | 4/2019 | Love | B64D 35/024 |
| 2019/0329881 A1 | 10/2019 | Gaffiero et al. | |
| 2020/0023940 A1 | 1/2020 | Fukari et al. | |
| 2020/0023953 A1 | 1/2020 | Fukari et al. | |
| 2020/0180755 A1* | 6/2020 | Prud'Homme Lacroix | B64C 27/26 |

FOREIGN PATENT DOCUMENTS

| | | | |
|---|---|---|---|
| CN | 108750092 A | * 11/2018 | |
| JP | 2021115925 A | * 8/2021 | |
| WO | WO-2022190370 A1 | * 9/2022 | B64C 11/18 |

* cited by examiner

*Primary Examiner* — Timothy D Collins
*Assistant Examiner* — Justin Michael Heston
(74) *Attorney, Agent, or Firm* — XSENSUS LLP (57) ABSTRACT

A compound helicopter includes: a body; a first main wing extending from the body toward a right side in a proceeding direction of the body; a second main wing extending from the body toward a left side in the proceeding direction of the body; a main rotor disposed at an upper side of the body; a first propeller that is disposed at the first main wing and generates positive thrust when the proceeding direction is regarded as positive; and a second propeller that is disposed at the second main wing and generates positive thrust and negative thrust. Specifications of the first propeller are different from specifications of the second propeller.

15 Claims, 6 Drawing Sheets

COMPOUND HELICOPTER

CROSS-REFERENCE TO RELATED APPLICATION

This application is a continuation of PCT/JP2021/010133, filed Mar. 12, 2021, the entire contents of which is hereby incorporated by reference in its entirety.

TECHNICAL FIELD

The present disclosure relates to a compound helicopter.

BACKGROUND ART

As a conventional compound helicopter is known. The rotary wing aircraft includes a body, a main rotor, a pair of propellers for propulsion, and a stabilizer. The main rotor is arranged on the body. The pair of propellers for propulsion are arranged at both sides of the body. The stabilizer is arranged at a rear end of the body. Each of the propellers for propulsion includes blades, and a flap is disposed at the stabilizer.

SUMMARY

A compound helicopter according to an aspect of the present disclosure includes: a body; a first main wing extending from the body toward a right side in a proceeding direction of the body; a second main wing extending from the body toward a left side in the proceeding direction of the body; a main rotor disposed at an upper side of the body; a first propeller that is disposed at the first main wing and generates positive thrust when the proceeding direction is regarded as positive; and a second propeller that is disposed at the second main wing and generates positive thrust and negative thrust. Specifications of the first propeller are different from specifications of the second propeller.

DESCRIPTION OF EMBODIMENTS

Embodiment 1

Configuration of Compound Helicopter

Figure 1:
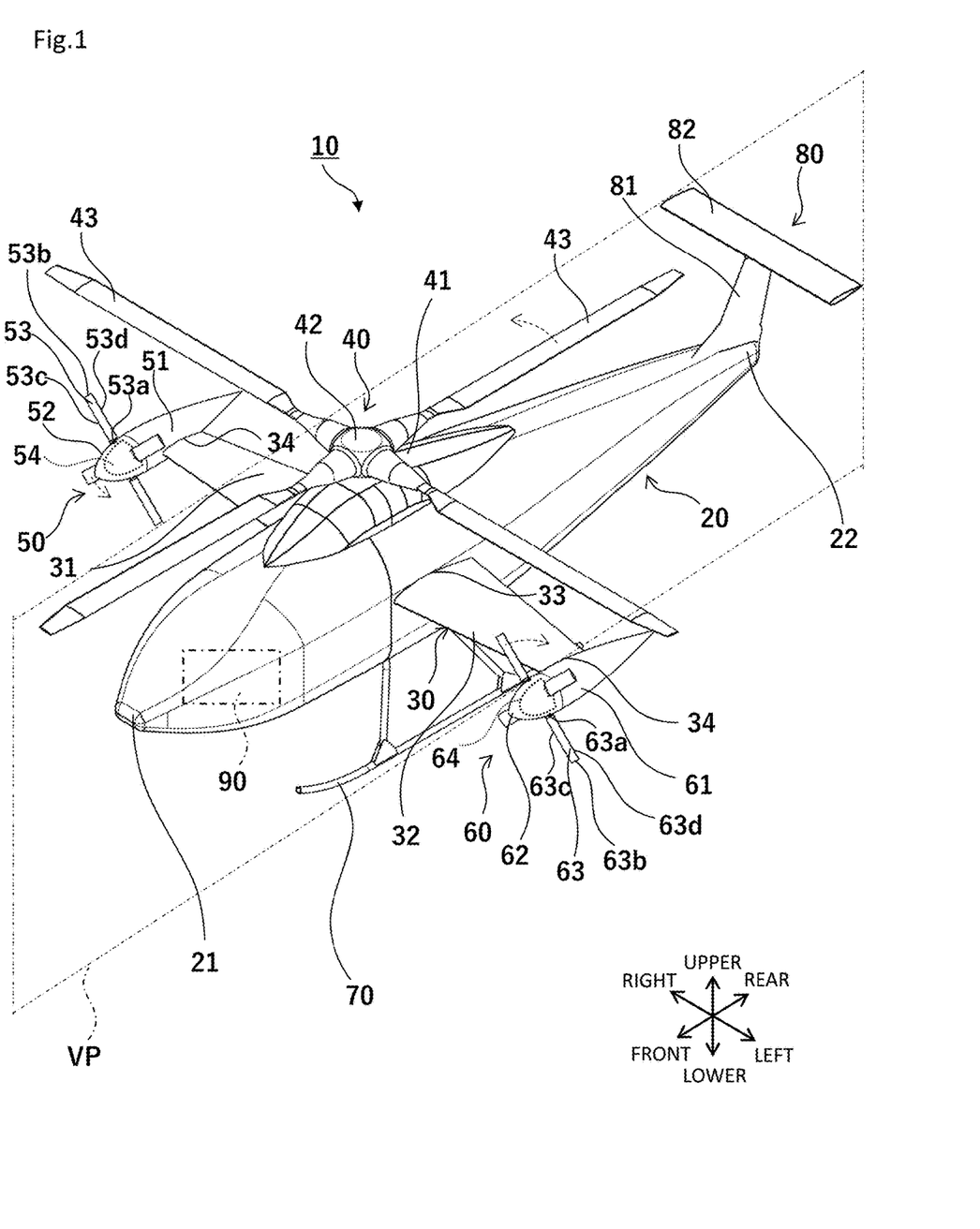
FIG. 1 is a perspective view showing a compound helicopter according to Embodiment 1.

A compound helicopter 10 according to Embodiment 1 is an aircraft including components that generate propulsive force in addition to components that generate lift force. As shown in FIG. 1, the compound helicopter 10 includes a body 20, a main wing 30, a main rotor 40, a pair of propellers 50 and 60 that are different in specifications from each other, a landing gear 70, an empennage 80, and a controller 90.

The main rotor 40 and the landing gear 70 are arranged so as to sandwich the body 20 in an upper-lower direction. A side of main rotor 40 is referred to as an upper side. An opposite side of upper side is referred to as a lower side. The first propeller 50 and the second propeller 60 are arranged so as to sandwich the body 20 in a left-right direction. The first propeller 50 is arranged at a right side of the main wing 30 in a proceeding direction of the compound helicopter 10. The second propeller 60 is arranged at a left side of the main wing 30 in the proceeding direction of the compound helicopter 10. As described below, when the proceeding direction is regarded as positive, the first propeller 50 generates only positive thrust, and the second propeller 60 generates positive thrust and negative thrust. Therefore, the first propeller 50 and the second propeller 60 are different in specifications from each other. In the following description, the "positive thrust" is also referred to as "forward thrust," and the "negative thrust" is also referred to as "backward thrust."

The body 20 extends from a nose 21 toward a tail 22 in an aircraft axis direction. When a plane is defined as a virtual symmetry plane VP, that orthogonal to the left-right direction at a middle point of the body 20 in the left-right direction, the body 20 has a shape symmetrical with respect to the virtual symmetry plane VP. The shape of the body 20 may be, for example, a prolate spheroid that extends in a front-rear direction or may not be symmetrical with respect to the virtual symmetry plane VP.

A main driving structure 41 that rotates the main rotor 40 is arranged at an upper portion of the body 20. The main driving structure 41 includes, for example, a prime mover, such as an engine.

The main rotor 40 includes a main rotor rotating shaft 42 and four main rotor blades 43 and generates lift force. The main rotor rotating shaft 42 is arranged at a middle of the body 20 in the left-right direction and at or in front of a middle of the body 20 in the front-rear direction. The main rotor rotating shaft 42 includes a lower end attached to an output portion of the main driving structure 41 and extends in a vertical direction. The main rotor rotating shaft 42 may be inclined relative to the upper-lower direction.

Each main rotor blade 43 is, for example, a rectangular elongated member and includes one end portion connected to the main rotor rotating shaft 42. The main rotor blades 43 are arranged at regular intervals in a circumferential direction about the main rotor rotating shaft 42 and extend radially from the main rotor rotating shaft 42.

An output of the main driving structure 41 is transmitted to the main rotor blades 43, through the main rotor rotating shaft 42, to rotate the main rotor blades 43 about the main rotor rotating shaft 42. Pitch angles of the main rotor blades 43 may be controlled such that the lift force generated by the main rotor 40 becomes maximum.

The main wing 30 includes a first main wing portion 31 and a second main wing portion 32, and generates lift force during forward flight. The first main wing portion 31 extends from the right side in a proceeding-direction of the body 20, and the second main wing portion 32 extends from the left side in a proceeding-direction of the body 20. The first main wing portion 31 and the second main wing portion 32 are formed symmetrical with respect to the virtual symmetry plane VP, and extend in respective directions intersecting with the virtual symmetry plane VP. For example, the directions of first main wing portion 31 and the second main wing portion 32 may be orthogonal to the virtual symmetry plane VP.

Each of the main wing portions 31 and 32 includes a wing root 33 and a wing tip 34. The wing root 33 is connected to the body 20. For example, in a top view, each of the main wing portions 31 and 32 has such a trapezoidal shape that a dimension of the wing root 33 in the front-rear direction is larger than a dimension of the wing tip 34 in the front-rear direction.

The first propeller 50 that generates propulsive force and a first driving structure 51 that rotates the first propeller 50 are disposed at the wing tip 34 of the first main wing portion 31. The second propeller 60 that generates propulsive force and a second driving structure 61 that rotates the second propeller 60 are disposed at the wing tip 34 of the second main wing portion 32. The first driving structure 51 and the second driving structure 61 are driven by a drive shaft connected to the main driving structure 41. The first propeller 50 includes a first rotating shaft 52 and four first propeller blades 53. The second propeller 60 includes a second rotating shaft 62 and four second propeller blades 63.

The first rotating shaft 52 and the second rotating shaft 62 extend in a direction parallel to the aircraft axis direction. A rear end portion of the first rotating shaft 52 is attached to an output portion of the first driving structure 51, and a rear end portion of the second rotating shaft 62 is attached to an output portion of the second driving structure 61. With this, the rotating shaft 52 rotates by the driving structure 51 at, for example, a fixed speed, and the rotating shaft 62 rotates by the driving structure 61 at, for example, a fixed speed.

The first propeller blades 53 are attached to a front end portion of the first rotating shaft 52 and arranged at regular intervals in the circumferential direction about the first rotating shaft 52. The second propeller blades 63 are attached to a front end portion of the second rotating shaft 62 and arranged at regular intervals in the circumferential direction about the second rotating shaft 62. The front end portion of the rotating shaft 52, to which the propeller blades 53 are attached has a pyramid shape and projects forward. The front end portion of the rotating shaft 62, to which the propeller blades 63 are attached, has a pyramid shape and projects forward. The pyramid shape is, for example, a cone shape.

The propeller blades 53 rotate about the rotating shaft 52, and the propeller blades 63 rotate about the rotating shaft 62. At this time, the first propeller blade 53 rotates counterclockwise at a fixed speed v, and the second propeller blade 63 rotates clockwise at the fixed speed v. As above, the first propeller blade 53 and the second propeller blade 63 rotate in respective directions opposite to each other at the same rotational speed.

A first pitch variable structure 54, that varies the pitch angles of the first propeller blades 53, is disposed at a portion to which the first propeller blades 53 are attached. Similarly, a second pitch variable structure 64, that varies the pitch angles of the second propeller blades 63, is disposed at a portion to which the second propeller blades 63 are attached. The direction and magnitude of propulsive force generated by each propeller blade 53 and the direction and magnitude of propulsive force generated by each propeller blade 63 are controlled by changing the pitch angles.

Specifically, the first pitch variable structure 54 sets the first propeller blade 53 to the positive pitch angle to make the first propeller blade 53 generate forward thrust (positive thrust). On the other hand, the second pitch variable structure 64 sets the second propeller blade 63 to the positive or negative pitch angle in accordance with a flight state, to make the second propeller blade 63 generate forward thrust (positive thrust) or backward thrust (negative thrust).

For example, the first and second propeller blades 53 and 63 are smaller than the main rotor blades 43, are rectangular, and extend radially from the respective rotating shafts 52 and 62. Each propeller blade 53 includes a base end portion 53a and a tip portion 53b at both end portions thereof in a longitudinal direction. Each propeller blade 63 includes a base end portion 63a and a tip portion 63b at both end portions thereof in the longitudinal direction. The base end portions 53a of the propeller blades 53 are connected to the rotating shaft 52, and the base end portions 63a of the propeller blades 63 are connected to the rotating shaft 62.

As shown in FIGS. 2A, 2B, 3A, and 3B, each first propeller blade 53 includes a leading edge 53c and a trailing edge 53d, and each second propeller blade 63 includes a leading edge 63c and a trailing edge 63d. The leading edge 53c is connected to one end of the base end portion 53a and one end of the tip portion 53b, and the leading edge 63c is connected to one end of the base end portion 63a and one end of the tip portion 63b. The trailing edge 53d is connected to the other end of the base end portion 53a and the other end of the tip portion 53b, and the trailing edge 63d is connected to the other end of the base end portion 63a and the other end of the tip portion 63b.

Figure 2A:
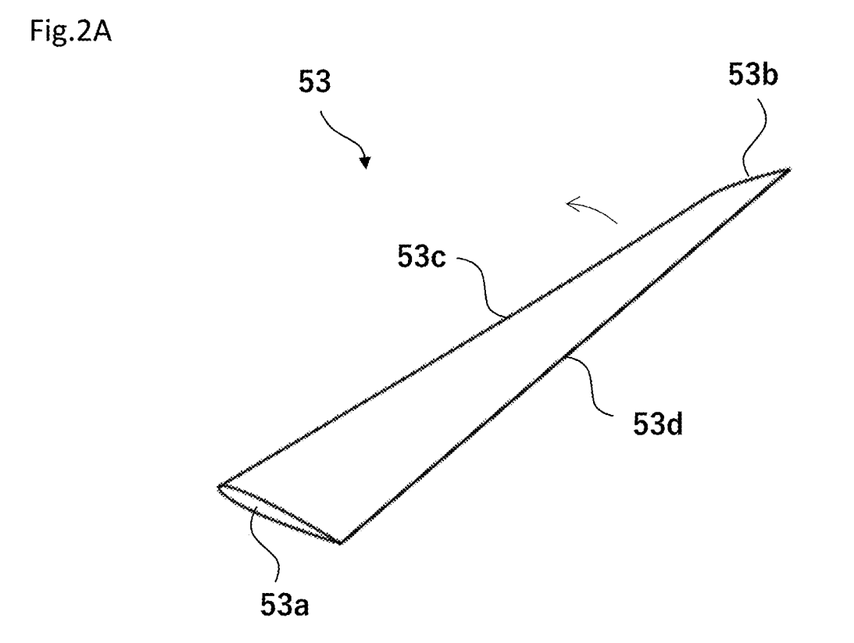
FIG. 2A is a perspective view showing a first propeller blade of FIG. 1.
Figure 2B:
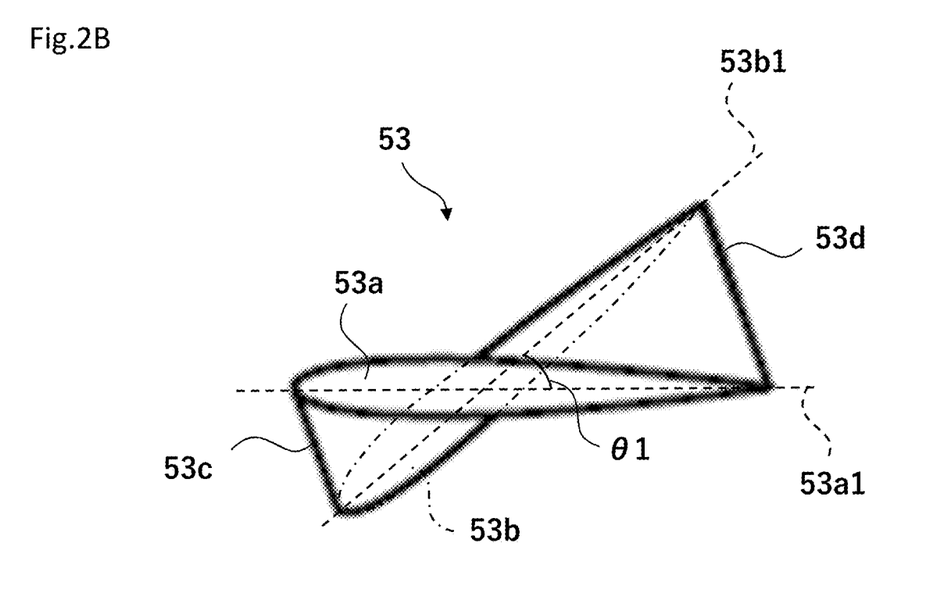
FIG. 2B is a sectional view of the first propeller blade of FIG. 2A.
Figure 3A:
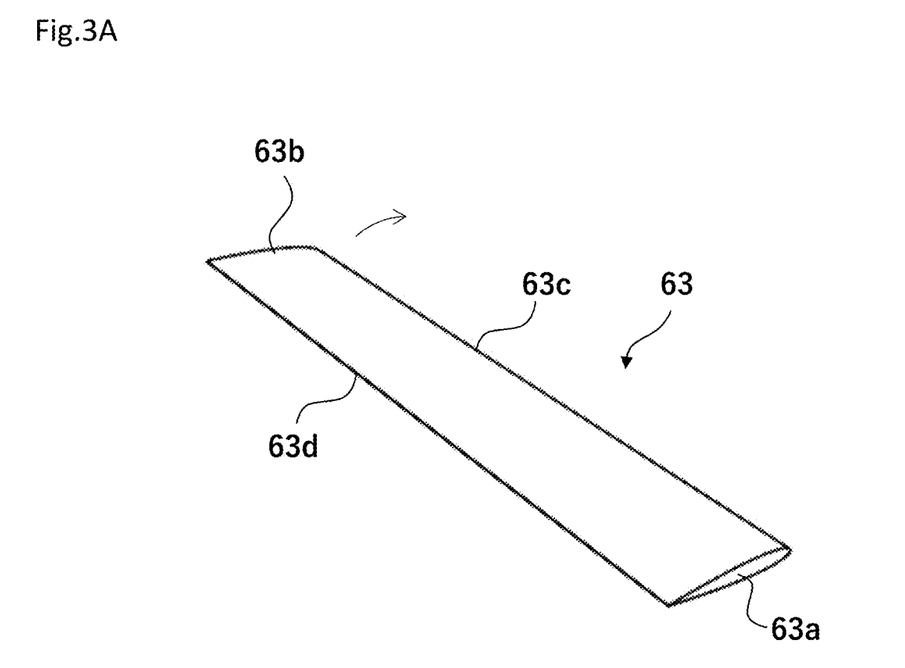
FIG. 3A is a perspective view of a second propeller blade of FIG. 1.
Figure 3B:
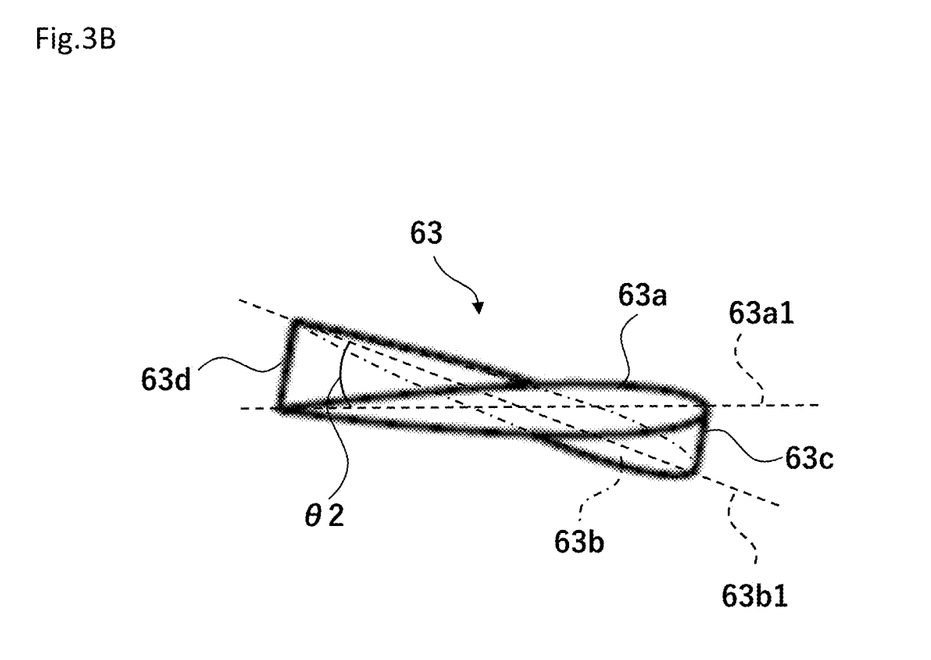
FIG. 3B is a sectional view of the second propeller blade of FIG. 3A.

For example, a blade section of the first propeller blade 53 has a round shape at the leading edge 53c and a sharp shape at the trailing edge 53d, and a thickness of the first propeller blade 53 is larger at the leading edge 53c than at the trailing edge 53d. For example, a blade section of the second propeller blade 63 has a round shape at the leading edge 63c and a sharp shape at the trailing edge 63d, and a thickness of the second propeller blade 63 is larger at the leading edge 63c than at the trailing edge 63d.

An angle of attack of the first propeller blade 53 decreases from the base end portion 53a to the tip portion 53b, i.e., is designed as washout. An angle of attack of the second propeller blade 63 decreases from the base end portion 63a to the tip portion 63b, i.e., is designed as washout.

A washout angle of the first propeller blade 53 is a difference between an angle of incidence of the base end portion 53a and an angle of incidence of the tip portion 53b. In other words, the washout angle of the first propeller blade 53 is an acute angle between a chord line 53a1 of the base end portion 53a and a chord line 53b1 of the tip portion 53b. The washout angle of the first propeller blade 53 is, for example, 10 degrees or more and 50 degrees or less. A washout angle of the second propeller blade 63 is a difference between an angle of incidence of the base end portion 63a and an angle of incidence of the tip portion 63b. In other words, the washout angle of the second propeller blade 63 is an acute angle between a chord line 63a1 of the base end portion 63a and a chord line 63b1 of the tip portion 63b. The washout angle of the second propeller blade 63 is, for example, 10 degrees or more and 50 degrees or less. The chord line 53a1 is a line connecting the leading edge 53c and the trailing edge 53d at the base end portion 53a. The chord line 53b1 is a line connecting the leading edge 53c and the trailing edge 53d at the tip portion 53b. The chord line 63a1 is a line connecting the leading edge 63c and the trailing edge 63d at the base end portion 63a. The chord line 63b1 is a line connecting the leading edge 63c and the trailing edge 63d at the tip portion 63b.

Specifications of the first propeller 50 are different form specifications of the second propeller 60. Specifically, the specifications are set such that the negative thrust generated by the second propeller 60 is larger than the negative thrust generated the first propeller 50 under certain conditions. Certain conditions are as follows: the main rotor 40 rotates counterclockwise; the pitch angles of the first propeller blades 53 and the pitch angles of the second propeller blades 63 are set to the negative pitch angles; and the first propeller blades 53 and the second propeller blades 63 rotate at the same rotational speed. Moreover, the specifications are set such that a difference between an absolute value of thrust generated when the main rotor 40 rotates counterclockwise, the pitch angles of the first propeller blades 53 and the pitch angles of the second propeller blades 63 are set to the positive pitch angles, and the first propeller blades 53 and the second propeller blades 63 rotate at the same rotational speed and an absolute value of thrust generated when the pitch angles of the first propeller blades 53 and the pitch angles of the second propeller blades 63 are set to the negative pitch angles, and the first propeller blades 53 and the second propeller blades 63 rotate at the same rotational speed is smaller in the second propeller 60 than in the first propeller 50. For example, in the present embodiment, a washout angle θ2 of the second propeller blade 63 is smaller than a washout angle θ1 of the first propeller blade 53.

The empennage 80 includes a vertical stabilizer 81 and a horizontal stabilizer 82. The empennage 80 has a T shape disposed at the tail 22 of the body 20. When the main rotor 40 rotates counterclockwise, the vertical stabilizer 81 generates lift force acting toward right side in a proceeding-direction.

The landing gear 70 is disposed at a lower portion of the body 20. For example, a landing foot, such as a skid, is used as the landing gear 70. The landing gear 70 is an apparatus that receives impact and supports the body 20 and the like, when the compound helicopter 10 lands on the ground.

The controller 90 is a calculation processing unit, such as a processor, which is arranged in the body 20 and controls respective components of the compound helicopter 10 for flight. The controller 90 controls the respective components, such as the main driving structure 41 and the pitch variable structures 54 and 64, based on outputs from a maneuvering device, various sensors, and the like.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Forces Acting on Compound Helicopter

Figure 4:
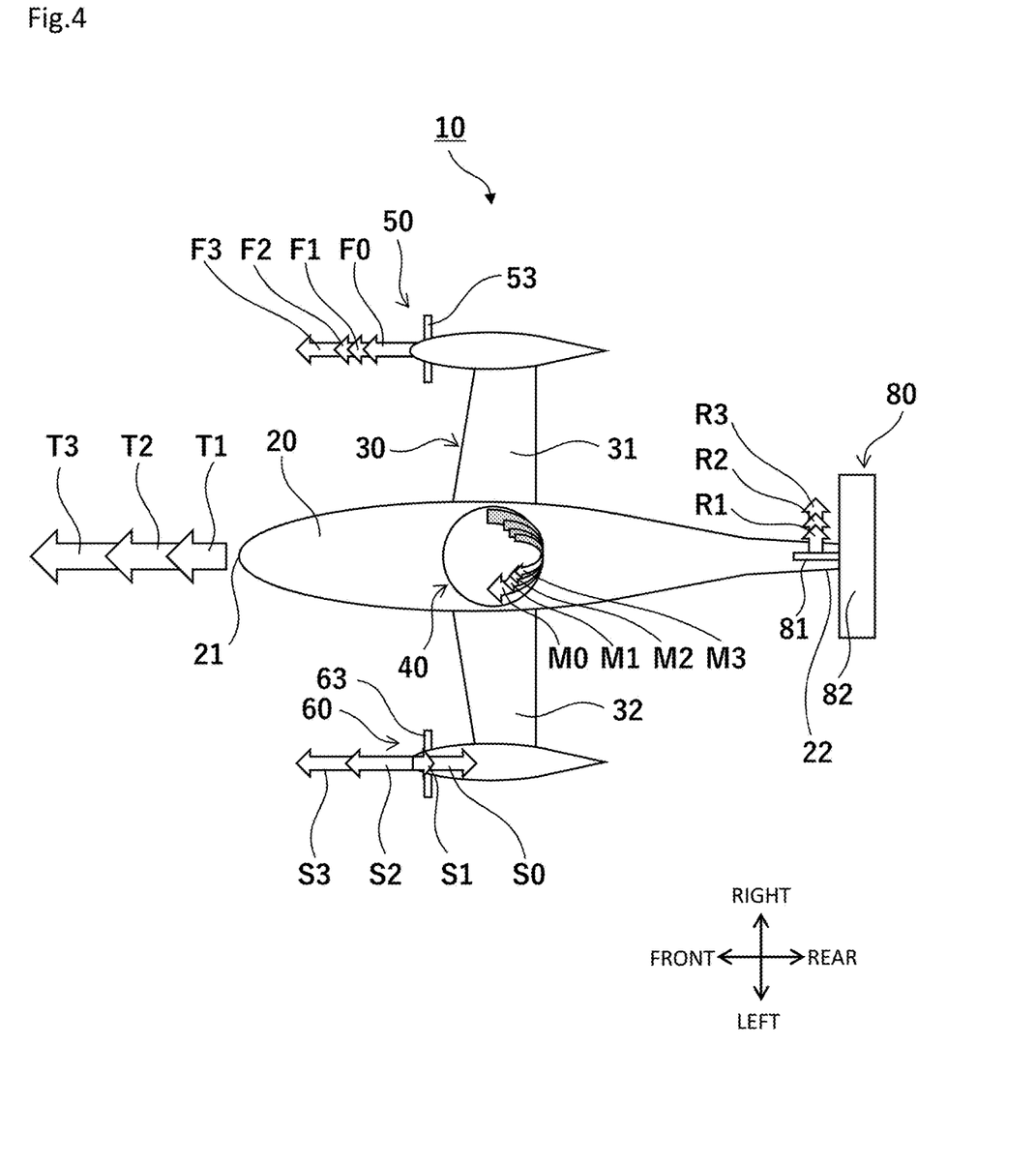
FIG. 4 is a schematic diagram showing forces in the compound helicopter of FIG. 1.

FIG. 4 is a diagram schematically showing forces generated during the flight of the compound helicopter 10. FIG. 4 shows propulsive force and some forces which contribute to yaw rotation of an airframe.

In a top view, the main rotor 40 rotates counterclockwise during the flight of the compound helicopter 10. Therefore, in a top view, each main rotor blade 43 rotates about the main rotor rotating shaft 42 from the tail 22 side of the body 20 through the first main wing portion 31 side to the nose 21 side of the body 20. The tail 22 side of the body 20 is also called the rear side. The first main wing portion 31 side is also called the right side. The nose 21 side of the body 20 is also called the front side.

During the flight of the compound helicopter 10, each of the first propeller 50 and the second propeller 60 rotates at a fixed speed in a fixed direction. The first propeller 50 and the second propeller 60 rotate in respective directions opposite to each other. For example, in a front view, the first propeller 50 rotates counterclockwise, and the second propeller 60 rotates clockwise.

Forces Acting on Compound Helicopter During Hovering

During the hovering of the compound helicopter 10, a forward speed is 0 kt, and the compound helicopter 10 stands still in the air. At this time, rotational torque of the main rotor 40 becomes high so as the lift force corresponding to the weight of the airframe itself is generated by the rotation of the main rotor 40. By this rotational torque, the body 20 receives a moment M0 acting in a direction opposite to the rotational direction of the main rotor 40. In this embodiment, the moment M0 acting in clockwise. The moment M0 increases as the rotational torque increases.

Forward thrust F0 is generated by the first propeller 50, and backward thrust S0 is generated by the second propeller 60, for canceling the rotational torque of the main rotor 40. Forward thrust F0 is also called positive thrust. Backward thrust S0 is also called negative thrust. Specifically, the first pitch variable structure 54 adjusts each first propeller blade 53 to the positive pitch angle, and the second pitch variable structure 64 adjusts each second propeller blade 63 to the negative pitch angle. Then, the moment M0 is canceled by the positive thrust F0 and the negative thrust S0. Thus, the compound helicopter 10 maintains its posture without rotating in a yaw direction. Moreover, the negative thrust S0 is equal to or substantially equal to the positive thrust F0, and therefore, the compound helicopter 10 does not move in the front-rear direction.

Forces Acting on Compound Helicopter During Low-Speed Flight

To make the compound helicopter 10 perform forward flight at low speed, for example, 80 kt, from the hovering state, the positive thrust of the first propeller 50 is increased from F0 to F1.

By this forward flight, the lift force is generated by the main wing 30, and the contribution of the lift force generated by the main rotor 40 decreases. Thus, the rotational torque of the main rotor 40 decreases. Therefore, a moment M1 of the body 20, which is a reaction of the rotational torque, becomes smaller than the moment M0. With this, the negative thrust of the second propeller 60, that generated to cancel the rotational torque of the main rotor 40, decreases from S0 to S1. Moreover, a lift force R1 acting toward the right side is generated at the vertical stabilizer 81 by the forward flight.

The moment M1 is canceled by the lift force R1 generated by the vertical stabilizer 81, the positive thrust F1, and the negative thrust S1. Thus, the compound helicopter 10 maintains its posture without rotating in the yaw direction.

Moreover, the positive thrust F1 is larger than the negative thrust S1, and therefore, forward thrust T1 is given to the compound helicopter 10. Thus, the compound helicopter 10 moves forward.

As above, the first propeller 50 generates the positive thrust, and the second propeller 60 generates the negative thrust, during the low-speed flight that is an initial stage of the forward flight from the hovering state.

Forces Acting on Compound Helicopter During Flight after Low-Speed Flight

To increase the forward speed of the compound helicopter 10 to 150 kt, the positive thrust of the first propeller 50 is increased from F1 to F2. At this time, the second pitch variable structure 64 changes the pitch angle of the second propeller blade 63 from the negative pitch angle to the positive pitch angle to make the second propeller 60 generate positive thrust S2. With this, the thrust F2 of the first propeller 50 and the thrust S2 of the second propeller 60 are used as the forward thrust, and the compound helicopter 10 moves forward while increasing its speed by the positive thrust T2.

By this speed increase, the lift force generated by the main wing 30 further increases. With this, the moment of the body 20 decreases to M2. Moreover, the lift force of the vertical stabilizer 81 increases from R1 to R2. The moment M2 is canceled by the lift force R2, the positive thrust F2, and the positive thrust S2. Thus, the compound helicopter 10 maintains its posture without rotating in the yaw direction.

Then, the forward speed of the compound helicopter 10 further increases and becomes, for example, 200 kt. To increase the propulsive force in the forward direction, the positive thrust of the first propeller 50 increases from F2 to F3, and the positive thrust of the second propeller 60 increases from S2 to S3. The positive thrust of the compound helicopter 10 increases to T3 that is the sum of the positive thrust F3 and the positive thrust S3. Thus, the compound helicopter 10 moves forward at high speed. The positive thrust S3 is equal to or substantially equal to the positive thrust F3.

The moment of the body 20 decreases to M3 in accordance with a further increase in the lift force generated by the main wing 30, the further increase being caused by the speed increase. Moreover, the lift force of the vertical stabilizer 81 increases to R3. The moment M3 is canceled by the lift force R3. Thus, the compound helicopter 10 maintains its posture without rotating in the yaw direction.

As above, both the first propeller 50 and the second propeller 60 generate the positive thrust, during the forward flight after the low-speed flight.

Washout Angles of First and Second Propeller Blades

Appropriate washout angles of the first and second propeller blades 53 and 63 are set to change the thrust of the first propeller 50, the thrust of the second propeller 60, and the direction of the thrust in accordance with the flight state, such as the hovering, the low-speed forward flight, or the high-speed forward flight.

Figure 5A:
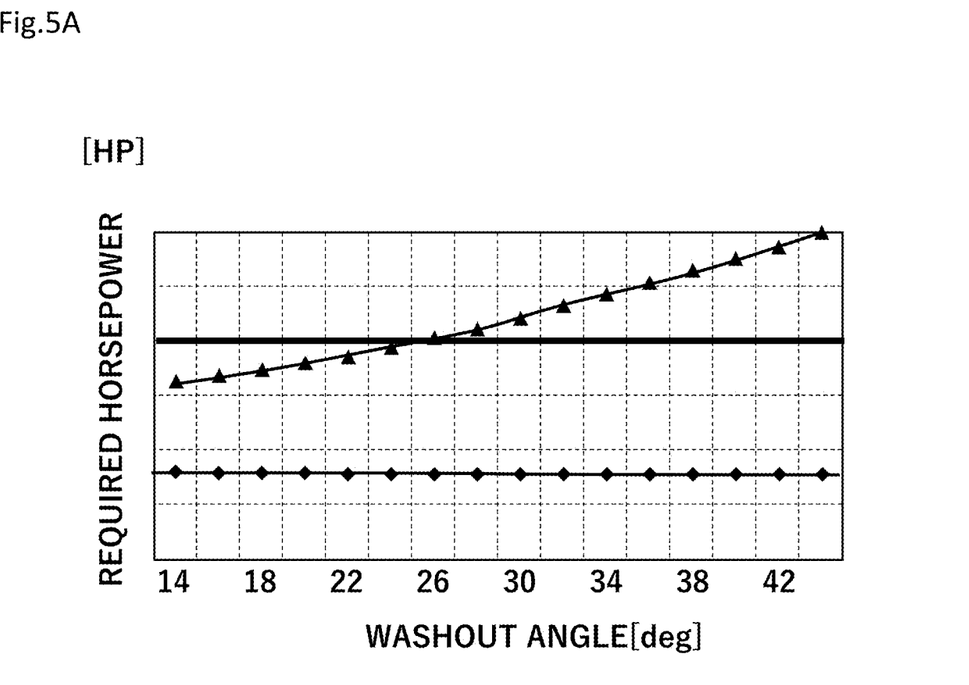
FIG. 5A is a graph showing an efficiency of the compound helicopter of FIG. 1 during hovering.
Figure 5B:
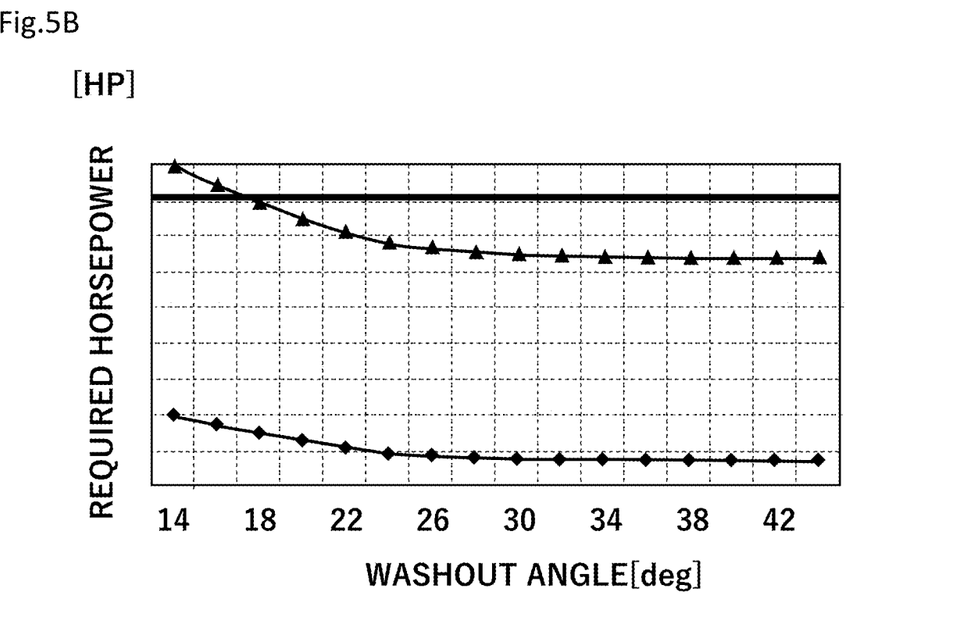
FIG. 5B is a graph showing the efficiency of the compound helicopter of FIG. 1 during high-speed flight.

FIG. 5A is a graph showing efficiencies of the propellers during the hovering of the compound helicopter 10. FIG. 5B is a graph showing the efficiencies of the propellers during the high-speed flight of the compound helicopter 10. The high-speed flight means, for example, a flight at 200 kt. In each graph, a horizontal axis represents the washout angles of the propeller blades 53 and 63, and a vertical axis represents required horsepower of rotating each propeller to generate thrust required in each flight state.

In each graph, a line passing through square dots represents a relation between the required horsepower of the first propeller 50 and the washout angle $\theta1$ of the first propeller blade 53. A line passing through triangle dots represents a relation between a sum of the required horsepower of the first propeller 50 and the required horsepower of the second propeller 60, and the washout angle $\theta2$ of the second propeller blade 63. A thick line represents a propeller horsepower upper limit. The propeller horsepower upper limit is a value obtained by subtracting required horsepower of rotating the main rotor 40, from a horsepower upper limit of the main driving structure 41.

The scales of the vertical axes of FIGS. 5A and 5B are not necessarily equal to each other. Moreover, when the compound helicopter 10 moves forward, the main driving structure 41 is air-cooled. Therefore, the propeller horsepower upper limit during the high-speed flight of FIG. 5B is larger than the propeller horsepower upper limit during the hovering of FIG. 5A.

The first propeller 50 generates the positive thrust regardless of the flight state. Therefore, as shown in FIGS. 5A and 5B, the required horsepower does not significantly change regardless of the washout angle, but the required horsepower of the first propeller 50 decreases as the washout angle $\theta1$ of the first propeller blade 53 increases. In this case, when the washout angle $\theta1$ is 40 degrees, the required horsepower of the first propeller 50 becomes minimum. Therefore, a thrust efficiency of the first propeller 50 improves as the washout angle $\theta1$ increases, for example, as the washout angle $\theta1$ approaches 40 degrees.

On the other hand, the direction of the thrust of the second propeller 60 changes in accordance with the speed of the compound helicopter 10. The second propeller 60 generates the negative thrust during the hovering and the low-speed flight that is the initial stage of the forward flight, and generates the positive thrust during the high-speed flight. Therefore, as shown in FIGS. 5A and 5B, the required horsepower of the second propeller 60 significantly changes by the washout angle $\theta2$. The tendency of the change in the required horsepower of the second propeller 60 differs between during the hovering of FIG. 5A and during the high-speed flight of FIG. 5B. Therefore, the washout angle $\theta2$ of the second propeller 60 is set to a value which is smaller than the propeller horsepower upper limit and by which both the required horsepower during the hovering and the required horsepower during the high-speed flight become small.

For example, as shown in FIG. 5B, the required horsepower of the second propeller 60 decreases as the washout angle $\theta2$ of the second propeller blade 63 increases during the high-speed flight, as with the first propeller 50. Therefore, as the washout angle $\theta2$ increases, for example, the washout angle $\theta2$ approaches 40 degrees, the thrust efficiency of the second propeller 60 improves.

On the other hand, as shown in FIG. 5A, during the hovering, as the washout angle $\theta2$ of the second propeller blade 63 decreases, the required horsepower of the second propeller 60 decreases. Therefore, as the washout angle $\theta2$ decreases, the thrust efficiency of the second propeller 60 improves.

As above, as shown in FIG. 5A, the upper limit of the washout angle $\theta2$ is, for example, 26 degrees that is a value at which the sum of the required horsepower of the first propeller 50 and the required horsepower of the second propeller 60 and the propeller horsepower upper limit coincide with each other. As shown in FIG. 5B, the lower limit of the washout angle $\theta2$ is, for example, 18 degrees that is a value at which the sum of the required horsepower of the first propeller 50 and the required horsepower of the second propeller 60 and the propeller horsepower upper limit coincide with each other. Within this range, the washout angle θ2 is set to, for example, 22 degrees in consideration of a margin.

Actions and Effects

As above, the required thrust of the first propeller 50, the required thrust of the second propeller 60, and the direction of the thrust change in accordance with the flight state, such as the hovering, the low-speed flight, or the high-speed flight. Therefore, the specifications of the left propeller and the specifications of the right propeller do not have to be the same as each other, and the propellers most suitable for the compound helicopter can be realized.

Specifically, the second propeller 60 generates the negative thrust during the hovering and the low-speed flight that is the initial stage of the forward flight, and generates the positive thrust after the low-speed flight. On the other hand, the first propeller 50 generates the positive thrust regardless of the flight state.

The propeller specifications are set by, for example, adjusting the washout angles of the propeller blades. The washout angle θ2 of the second propeller blade 63 is smaller than the washout angle θ1 of the first propeller blade 53. With this, the negative thrust of the second propeller blade 63 is larger than the negative thrust of the first propeller blade 53, if the first propeller blades 53 and the second propeller blades 63 rotate at the same rotational speed and the same negative pitch angle.

Moreover, the first propeller blades 53 generate positive thrust +Fp, and the second propeller blades 63 generate positive thrust +Sp, if the first propeller blades 53 and the second propeller blades 63 rotate at the same rotational speed and the same positive pitch angle, i.e., an angle +β. Furthermore, the first propeller blades 53 generate negative thrust −Fm, and the second propeller blades 63 generate negative thrust −Sm, if the first propeller blades 53 and the second propeller blades 63 rotate at the same rotational speed and the same negative pitch angle, i.e., an angle −β.

At this time, when the washout angle is 0 degree, and an absolute value of the positive pitch angle and an absolute value of the negative pitch angle are equal to each other, an absolute value of the positive thrust generated at the positive pitch angle and an absolute value of the negative thrust generated at the negative pitch angle become equal to each other. Moreover, when the absolute value of the positive pitch angle and the absolute value of the negative pitch angle are equal to each other, the absolute value of the positive thrust is larger than the absolute value of the negative thrust as the washout angle increases. In this case, a difference (Sp−Sm) between the absolute values of the thrusts of the second propeller blade 63, i.e., Sp−Sm, is smaller than a difference between the absolute values of the thrusts of the first propeller blade 53, i.e., Fp−Fm.

Therefore, the first propeller blade 53 is formed in a shape suitable for the generation of the positive thrust. On the other hand, the second propeller blade 63 is formed in a shape which suppresses a decrease in efficiency for the positive thrust and the negative thrust. Therefore, a flight efficiency of the compound helicopter 10 improves.

Moreover, the compound helicopter 10 is increased in speed, and the movement of the compound helicopter 10 in the yaw direction can be controlled by the thrust of the first propeller 50 and the thrust of the second propeller 60.

Embodiment 2

Figure 6A:
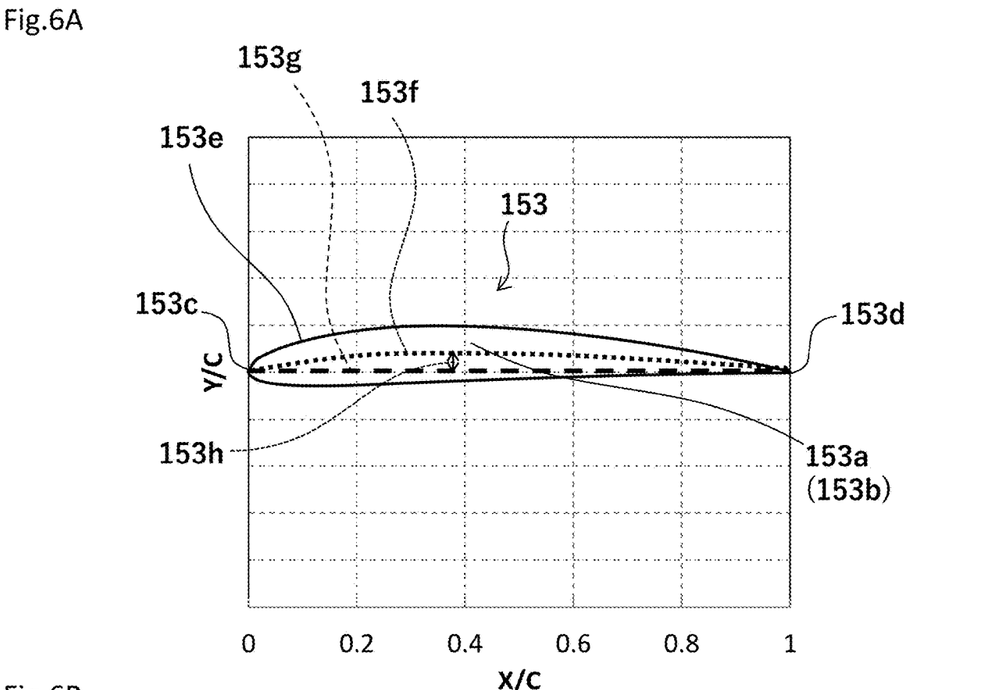
FIG. 6A is a sectional view showing the first propeller blade of the compound helicopter according to Embodiment 2.
Figure 6B:
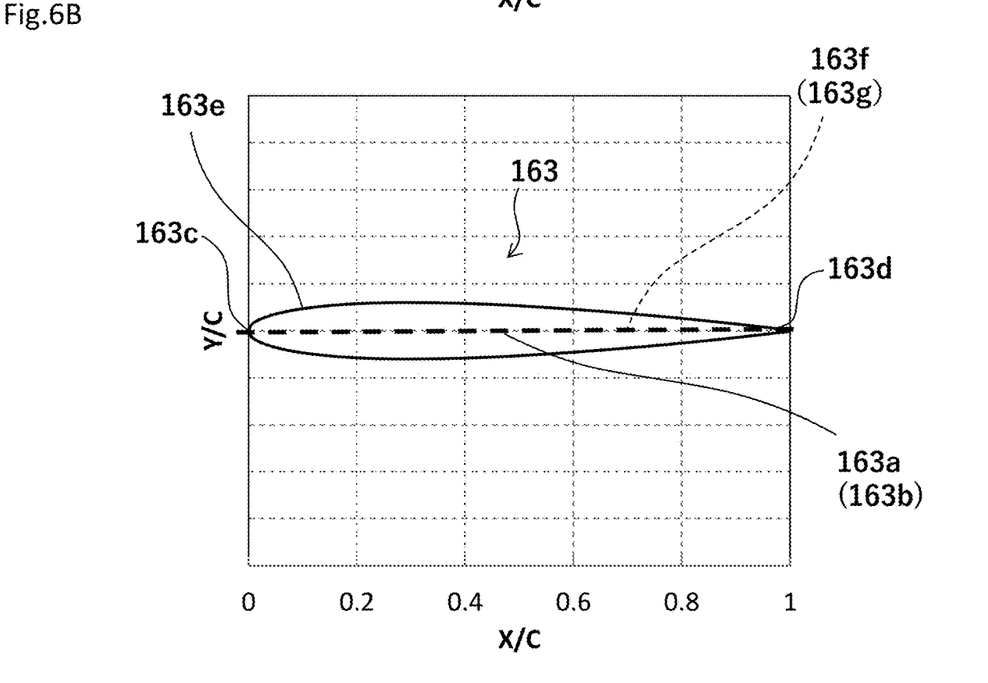
FIG. 6B is a sectional view of the second propeller blade of the compound helicopter according to Embodiment 2.

In the compound helicopter 10 according to Embodiment 1, the most suitable propellers are realized by making the washout angles of the first propeller 50 and the second propeller 60 different from each other among the specifications of the propellers. On the other hand, in the compound helicopter 10 according to Embodiment 2, as shown in FIG. 6, the blade sectional shapes of a first propeller blade 153 and a second propeller blade 163 are made different from each other.

A camber of the second propeller blade 163 is smaller than a camber of the first propeller blade 153. The camber of the first propeller blade 153 is a difference between a camber line 153f and a chord line 153g. The camber line 153f is a center line of a thickness of the sectional shape of the first propeller blade 153, and the chord line 153g is a straight line connecting leading and trailing edges of the first propeller blade 153. The camber of the second propeller blade 163 is a difference between a camber line 163f and a chord line 163g. The camber line 163f is a center line of a thickness of the sectional shape of the second propeller blade 163, and the chord line 163g is a straight line connecting leading and trailing edges of the second propeller blade 163. For example, as shown in FIG. 6A, the first propeller blade 153 is a camber blade whose camber is larger than zero. As shown in FIG. 6B, the second propeller blade 163 is a symmetric blade whose camber is zero. The propeller blades 153 and 163 are not designed as washout.

An external form line 153e is a line representing the shape of a section orthogonal to a longitudinal direction of the propeller blade 153, and an external form line 163e is a line representing the shape of a section orthogonal to a longitudinal direction of the propeller blade 163. The center line 153f is a line passing through a center between parts of the external form line 153e which parts are located at upper and lower sides of the chord line 153g that is the straight line connecting a leading edge 153c and a trailing edge 153d. The center line 163f is a line passing through a center between parts of the external form line 163e which parts are located at upper and lower sides of the chord line 163g that is the straight line connecting a leading edge 163c and a trailing edge 163d.

In the first propeller blade 153, the center line 153f is located above the chord line 153g, and a camber 153h is larger than zero. In this case, the first propeller blade 153 easily generates the positive thrust because the first propeller blade 153 is curved toward one side from the chord line 153g.

In the second propeller blade 163, the center line 163f coincides with the chord line 163g, and the camber is zero. As above, the second propeller blade 163 easily generates both the positive thrust and the negative thrust because the second propeller blade 163 has a symmetrical shape with respect to the chord line 163g.

Therefore, if the first propeller 50 and the second propeller 60 rotate at the same rotational speed and the same negative pitch angle, the negative thrust generated by the second propeller 60 becomes larger than the negative thrust generated by the first propeller 50. Thus, the flight efficiency of the compound helicopter 10 can be improved.

Modified Examples

As with Embodiment 1, in Embodiment 2, the propeller blade 153 may have the washout angle θ1, and the propeller blade 163 may have the washout angle θ2. To be specific, the second propeller blade 163 as the symmetric blade and the first propeller blade 153 as the camber blade are designed as washout, and the washout angle θ2 of the second propeller blade 163 is smaller than the washout angle θ1 of the first propeller blade 153.

In all of the above embodiments, except for the differences regarding the washout and the sectional shape, the shape of the first propeller blade 153 and the shape of the second propeller blade 163 may be the same as each other or may be different from each other. For example, the specifications of the propellers may be set such that a planar shape of the first propeller blade 153 and a planar shape of the first propeller blade 163 are made different from each other. The planar shape of the first propeller blade 153 is a shape surrounded by a base end portion 153*a*, a tip portion 153*b*, the leading edge 153*c*, and the trailing edge 153*d* in the first propeller blade 153. The planar shape of the first propeller blade 163 is a shape surrounded by a base end portion 163*a*, a tip portion 163*b*, the leading edge 163*c*, and the trailing edge 163*d* in the second propeller blade 163.

Moreover, in each of the embodiments, the rotational speed of the first propeller 50 and the rotational speed of the second propeller 60 are the same as each other. However, the rotational speed of the first propeller 50 and the rotational speed of the second propeller 60 may be different from each other such that the thrust and the direction of the thrust which correspond to the flight state are realized.

In all of the above embodiments, the first propeller 50 and the first driving structure 51 are attached to the first main wing portion 31, and the second propeller 60 and the second driving structure 61 are attached to the second main wing portion 32. However, the position of the first propeller 50 and the position of the second propeller 60 are not limited to these as long as the first propeller 50 is disposed at one side of the body 20, and the second propeller 60 is disposed at the other side of the body 20. For example, the first propeller 50 and the first driving structure 51 may be attached to one side of the body 20, and the second propeller 60 and the second driving structure 61 may be attached to the other side of the body 20.

The angle of attack of the first propeller blade 53 decreases from the base end portion 53*a* toward the tip portion 53*b*, i.e., is designed as washout, but is not limited to this. Moreover, the angle of attack of the second propeller blade 63 decreases from the base end portion 63*a* toward the tip portion 63*b*, i.e., is designed as washout, but is not limited to this. The angle of attack of each propeller blade may increase from the base end portion toward the tip portion, i.e., is designed as negative washout, i.e., wash-in.

The above embodiments may be combined with each other as long as they do not exclude each other. From the foregoing explanation, many modifications and other embodiments of the present disclosure are obvious to one skilled in the art. Therefore, the foregoing explanation should be interpreted only as an example and is provided for the purpose of teaching the best mode for carrying out the present disclosure to one skilled in the art. The structures and/or functional details may be substantially modified within the scope of the present disclosure.

INDUSTRIAL APPLICABILITY

The compound helicopter of the present disclosure is useful as, for example, a compound helicopter whose flight efficiency is improved.

The invention claimed is:

1. A compound helicopter comprising:
    a body;
    a first main wing extending from the body toward a right side in a proceeding direction of the body;
    a second main wing extending from the body toward a left side in the proceeding direction of the body;
    a main rotor disposed at an upper side of the body;
    a first propeller that is disposed at the first main wing and generates positive thrust when the proceeding direction is regarded as positive, and the first propeller can also generate negative thrust; and
    a second propeller that is disposed at the second main wing and generates positive thrust and negative thrust, wherein
    specifications of the first propeller are different from specifications of the second propeller, wherein:
    the first propeller includes a first propeller blade that is a propeller blade whose rotation axis extends in a direction parallel to an aircraft axis direction;
    the second propeller includes a second propeller blade that is a propeller blade whose rotation axis extends in a direction parallel to the aircraft axis direction;
    the first propeller blade includes a washout angle corresponding to a change in an angle of attack from a base end of the first propeller blade to a tip thereof;
    the second propeller blade includes a washout angle corresponding to a change in an angle of attack from a base end of the second propeller blade to a tip thereof; and
    the washout angle of the second propeller blade is smaller than the washout angle of the first propeller blade;
    a lower limit of the washout angle of the second propeller blade is a value at which a sum of required horsepower of rotating the first propeller blade to generate thrust for forward flight and required horsepower of rotating the second propeller blade to generate thrust for the forward flight coincides with a propeller horsepower upper limit; and
    an upper limit of the washout angle of the second propeller blade is a value at which a sum of required horsepower of rotating the first propeller blade to generate thrust for hovering and required horsepower of rotating the second propeller blade to generate thrust for the hovering coincides with the propeller horsepower upper limit.

2. The compound helicopter according to claim 1, wherein:
    the specifications of the first propeller and the second propeller include at least one of: a blade sectional shape of each propeller blade; a planar shape of each propeller blade; or rotational speeds of the first propeller and the second propeller.

3. The compound helicopter according to claim 2, wherein:
    a formula "Fp−Fm>Sp−Sm" is satisfied, where
        thrust generated by the first propeller is represented by +Fp, and thrust generated by the second propeller is represented by +Sp under conditions that the main rotor rotates counterclockwise in a top view, and the first propeller and the second propeller rotate at a same rotational speed and the same positive pitch angle, i.e., an angle β, and
        thrust generated by the first propeller is represented by −Fm, and thrust generated by the second propeller is represented by −Sm under conditions that the main rotor rotates counterclockwise in the top view, and the first propeller and the second propeller rotate at the same rotational speed and the same negative pitch angle, i.e., an angle −β.

4. The compound helicopter according to claim 2, wherein:
a camber of the second propeller blade is smaller than a camber of the first propeller blade, the camber being a difference between a camber line and a chord line, the camber line being a center line of a thickness of a sectional shape of each propeller blade, the chord line being a straight line connecting leading and trailing edges of each propeller blade.

5. The compound helicopter according to claim 1, wherein:
the first propeller generates the positive thrust during hovering and forward flight; and
the second propeller generates the negative thrust during the hovering and an initial stage of the forward flight and generates the positive thrust after the initial stage of the forward flight.

6. The compound helicopter according to claim 5, wherein:
a formula "Fp−Fm>Sp−Sm" is satisfied, where
thrust generated by the first propeller is represented by +Fp, and thrust generated by the second propeller is represented by +Sp under conditions that the main rotor rotates counterclockwise in a top view, and the first propeller and the second propeller rotate at a same rotational speed and the same positive pitch angle, i.e., an angle β, and
thrust generated by the first propeller is represented by −Fm, and thrust generated by the second propeller is represented by −Sm under conditions that the main rotor rotates counterclockwise in the top view, and the first propeller and the second propeller rotate at the same rotational speed and the same negative pitch angle, i.e., an angle −β.

7. The compound helicopter according to claim 5, wherein:
a camber of the second propeller blade is smaller than a camber of the first propeller blade, the camber being a difference between a camber line and a chord line, the camber line being a center line of a thickness of a sectional shape of each propeller blade, the chord line being a straight line connecting leading and trailing edges of each propeller blade.

8. The compound helicopter according to claim 1, wherein:
an absolute value of the negative thrust generated by the second propeller is larger than an absolute value of the negative thrust generated by the first propeller under conditions that the main rotor rotates counterclockwise in a top view, and the first propeller blade and the second propeller blade rotate at the same negative pitch angle and the same rotational speed.

9. The compound helicopter according to claim 8, wherein:
a formula "Fp−Fm>Sp−Sm" is satisfied, where
thrust generated by the first propeller is represented by +Fp, and thrust generated by the second propeller is represented by +Sp under conditions that the main rotor rotates counterclockwise in the top view, and the first propeller and the second propeller rotate at a same rotational speed and the same positive pitch angle, i.e., an angle β, and the thrust generated by the first propeller is represented by −Fm, and the thrust generated by the second propeller is represented by −Sm under conditions that the main rotor rotates counterclockwise in the top view, and the first propeller and the second propeller rotate at the same rotational speed and the same negative pitch angle, i.e., an angle −β.

10. The compound helicopter according to claim 8, wherein:
a camber of the second propeller blade is smaller than a camber of the first propeller blade, the camber being a difference between a camber line and a chord line, the camber line being a center line of a thickness of a sectional shape of each propeller blade, the chord line being a straight line connecting leading and trailing edges of each propeller blade.

11. The compound helicopter according to claim 1, wherein:
a formula "Fp−Fm>Sp−Sm" is satisfied, where
thrust generated by the first propeller is represented by +Fp, and thrust generated by the second propeller is represented by +Sp under conditions that the main rotor rotates counterclockwise in a top view, and the first propeller and the second propeller rotate at the same rotational speed and the same positive pitch angle, i.e., an angle β, and
thrust generated by the first propeller is represented by −Fm, and thrust generated by the second propeller is represented by −Sm under conditions that the main rotor rotates counterclockwise in the top view, and the first propeller and the second propeller rotate at the same rotational speed and the same negative pitch angle, i.e., an angle −β.

12. The compound helicopter according to claim 11, wherein:
a camber of the second propeller blade is smaller than a camber of the first propeller blade, the camber being a difference between a camber line and a chord line, the camber line being a center line of a thickness of a sectional shape of each propeller blade, the chord line being a straight line connecting leading and trailing edges of each propeller blade.

13. The compound helicopter according to claim 1, wherein the washout angle of the first propeller blade is such a value that required horsepower of rotating the first propeller blade to generate thrust for hovering and forward flight is minimum.

14. The compound helicopter according to claim 1, wherein:
a camber of the second propeller blade is smaller than a camber of the first propeller blade, the camber being a difference between a camber line and a chord line, the camber line being a center line of a thickness of a sectional shape of each propeller blade, the chord line being a straight line connecting leading and trailing edges of each propeller blade.

15. The compound helicopter according to claim 14, wherein:
the camber of the first propeller blade is larger than zero; and
the camber of the second propeller blade is zero.

* * * * *